USOO5233524A

United States Patent [19]
Jackson

[11] Patent Number: 5,233,524
[45] Date of Patent: Aug. 3, 1993

[54] DISTANCE TO A STATIONARY LOCATION ESTIMATOR FOR A MOVING VEHICLE

[75] Inventor: Joseph W. Jackson, Glendale, Ariz.

[73] Assignee: Honeywell Inc., Minneapolis, Minn.

[21] Appl. No.: 654,713

[22] Filed: Feb. 12, 1991

[51] Int. Cl.[5] .............................................. G06F 15/50
[52] U.S. Cl. ................................ 364/424.01; 364/428; 364/458
[58] Field of Search ................. 364/428–430, 364/432–434, 447, 458, 460, 462, 423–424.02, 443–446, 448–457, 459, 461; 342/33; 244/175, 180, 183–188, 76 R, 176–179, 181–182; 235/400–405, 411–417, 406–410

[56] References Cited
U.S. PATENT DOCUMENTS

| 3,118,059 | 1/1964 | Vago | 364/447 |
|---|---|---|---|
| 3,398,267 | 8/1968 | Hattendorf | 364/430 |
| 3,921,170 | 11/1975 | Schmidt | 235/414 X |
| 4,254,465 | 3/1981 | Land | 364/453 |
| 4,577,194 | 3/1986 | Ragsdale | 364/458 X |
| 4,951,214 | 8/1990 | Hollister | 364/460 |
| 5,014,053 | 5/1991 | Nguyen | 364/434 X |

*Primary Examiner*—Thomas G. Black
*Assistant Examiner*—Thomas S. Auchterlonie
*Attorney, Agent, or Firm*—Seymour Levine; Dale E. Jepsen; Al Medved

[57] ABSTRACT

An estimator for determining the distance of a moving vehicle to a stationary position includes the determination of actual and estimated velocities of the vehicle along a selected path. An up-dated distance estimate is established by multiplying estimated distance by the ratio of the actual velocity to the estimated velocity. The up-dated estimate is then utilized as the estimated and another up-dated distance is obtained. Iterations continue until the ratio approaches unity indicating that the estimated distance is approximately equal to the actual distance.

18 Claims, 6 Drawing Sheets

DISTANCE TO A STATIONARY LOCATION ESTIMATOR FOR A MOVING VEHICLE

BACKGROUND OF THE INVENTION

1. Field of the Invention

The invention pertains to the field of aircraft landing aid systems and more particularly to a distance estimator for a microwave landing system.

2. Description of the Prior Art

The Microwave Landing System (MLS) has two scanning beams, one in azimuth and one in elevation. Signals from these beams are received separately in a receiver/processor which calculates the elevation angle relative to the ground and the azimuth angle relative to a glide slope beam. These angles, distance to go information from Distance Measuring Equipment (DME), and auxiliary data such as minimum glide path, are utilized to guide an aircraft during a landing approach. Glide slope tracking accuracy is a function of the distance to go and the accuracy to which this distance is known. Normally, the distance to go is accurately provided by the DME. Without the DME, poor performance generally occurs, especially if the radio altitude signal is saturated to its full scale value, that is, above 2,500 feet. Control law designs of the prior art have incorporated procedures to weight the best performance to those maneuvers which have the highest probability of occurrence. These designs, however, exhibit poor stability for many maneuvers. To provide better stability, performance must be sacrificed. Such compromises between performance and stability are unacceptable for the MLS aircraft landing control system.

It is an object of the present invention to furnish a distance estimator when the DME is not available, which provides high performance, stable operation.

SUMMARY OF THE INVENTION

A distance estimator, in accordance with the present invention, utilizes an aircraft altitude, altitude rate, azimuth position relative to a predetermined plane, and the azimuth angular rate to provide an estimate of distance to a DME transmitter location. These parameters and an estimated distance are processed to establish ratios of longitudinal and lateral rates to an estimated location of the DME transmitter. By an iterative (feedback) procedure, updated distance estimates cause the ratios to approach unity, whereat an accurate distance estimate to the DME transmitter location is realized.

DESCRIPTION OF THE PREFERRED EMBODIMENTS

Figure 1A:
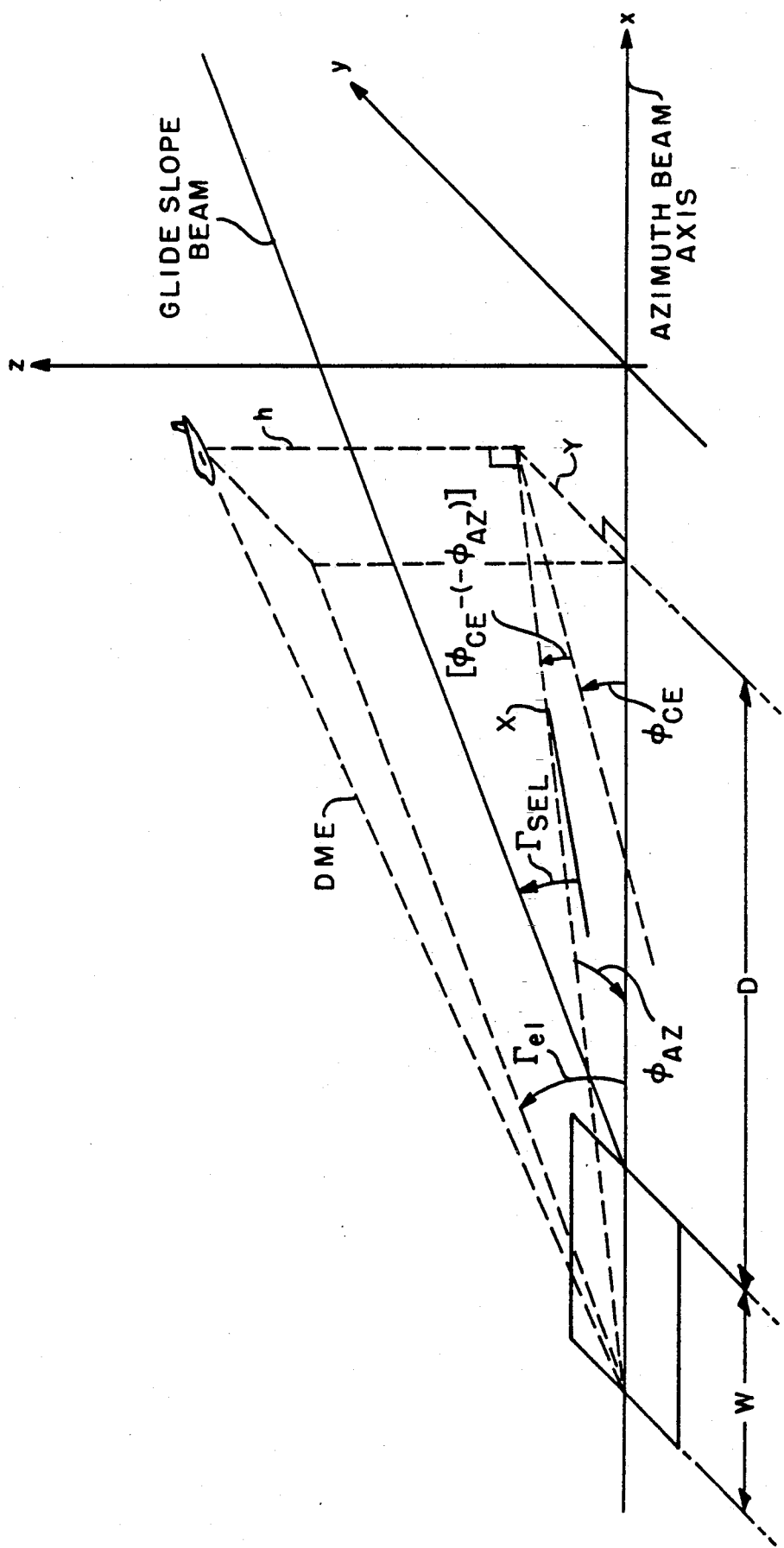
FIGS. 1a and 1b are geometrical figures useful for deriving and explaining parameters utilized in the preferred embodiment of the invention.
Figure 2:
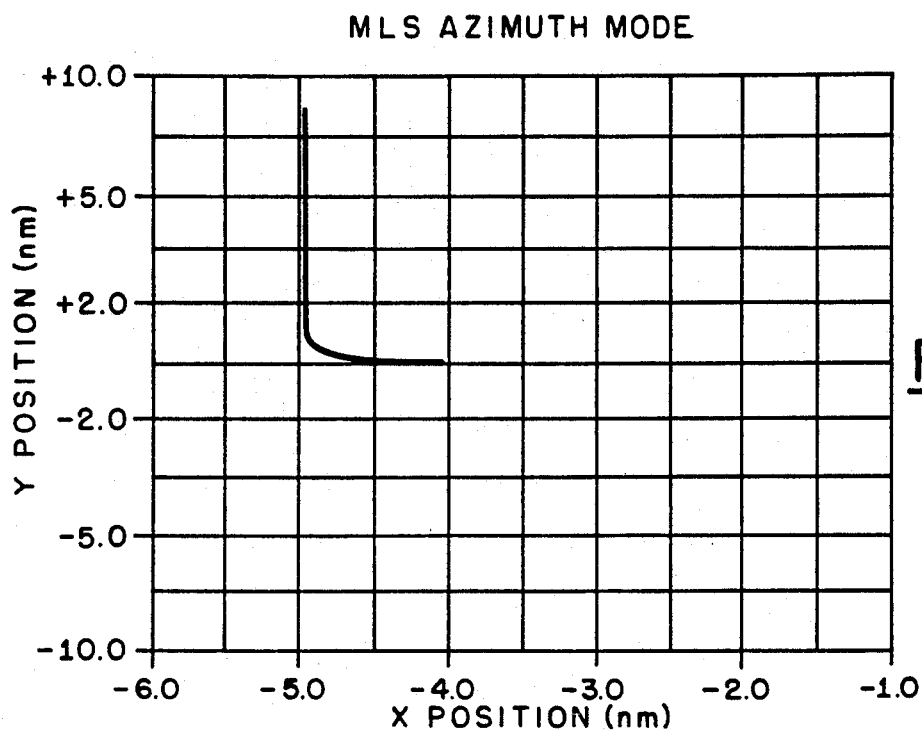
FIGS. 2-5 are graphs for demonstrating the accuracy of the invention.
Figure 3:
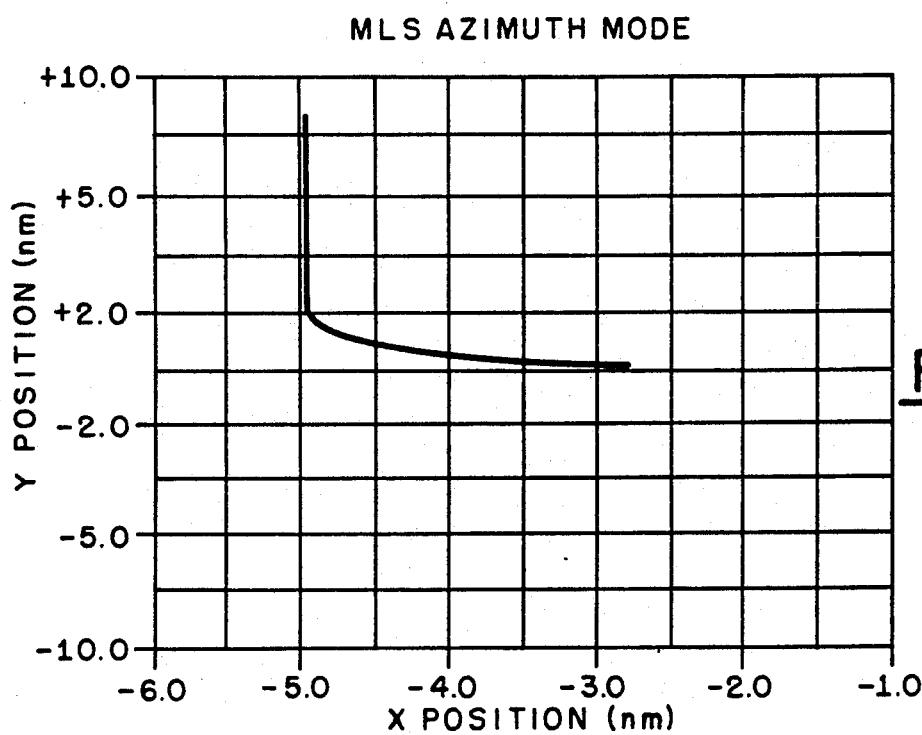
Figure 4:
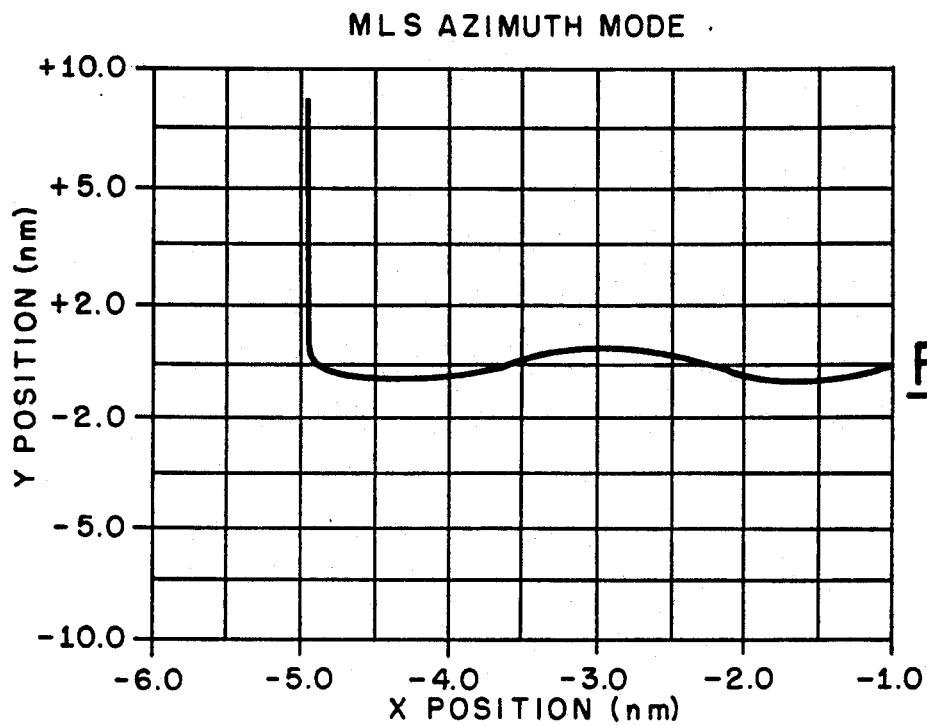
Figure 5:
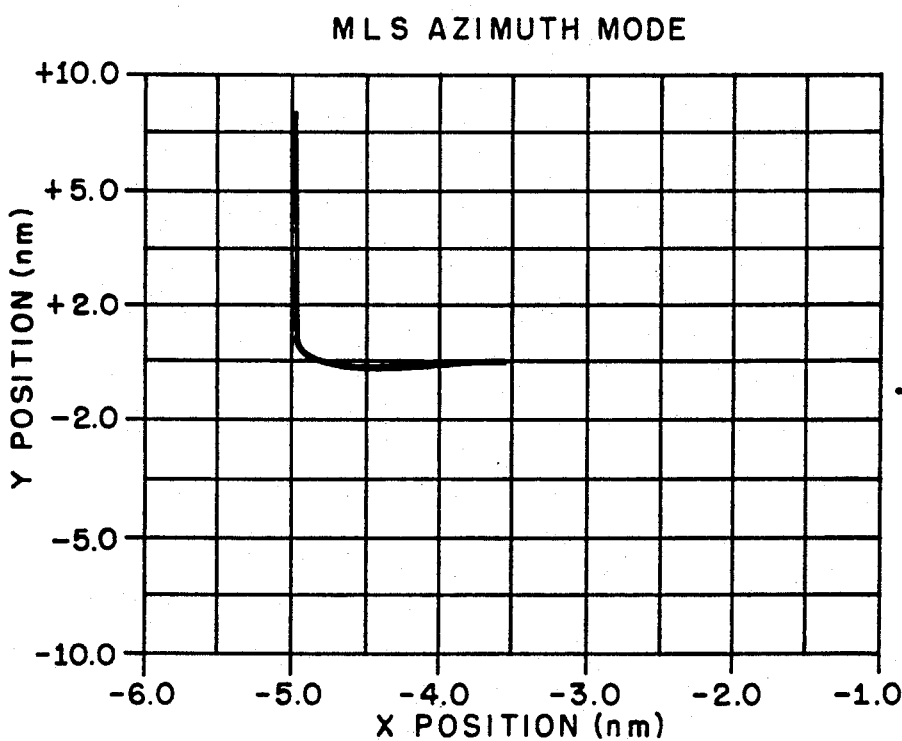

FIG. 1a is a geometrical representation of an aircraft approaching a runway for a landing. When the distance measuring equipment is operating properly, the slant range of the aircraft to the DME transmitter is accurately known. This range is utilized with the aircraft's elevation angle, $\Gamma_{el}$, the course error angle, $\Phi_{CE}$, and the angle off the glide slope wing, $\Phi_{AZ}$, to calculate an accurate distance of the aircraft position to the location of the DME transmitter X. When a signal from the Distance Measuring Equipment is not available, the DME transmitter cannot be determined, and the distance to the transmitter must be estimated. In a landing operation, the distance to the runway is utilized to acquire the MLS glide slope beam, which them guides the aircraft to the landing. FIGS. 2 through 5 are computer-generated plots of an aircraft's azimuth beam capture performance with the distance measuring equipment operational and for various estimated distances when the distance measuring equipment is not operational. FIG. 2 is a graph illustrating the performance of an aircraft for the capture of the azimuth beam when the initial coordinate position of the aircraft relative to the runway is at ($-4.98$, $8.65$), the aircraft is at an altitude of 6,000 feet, and has an airspeed of 160 kts. FIG. 3 represents an aircraft's capture performance when the DME is estimated as one-half the actual distance, while FIG. 4 is a plot of an aircraft's capture performance when the estimated distance is twice the DME. It is evident from these figures that a good distance estimate is required for a rapid azimuth beam capture. FIG. 5 is a plot of an aircraft azimuth beam capture performance when the DME transmitter distance estimate is made in accordance with the present invention. The performance shown in FIG. 5 compares favorably with that shown in FIG. 2. This favorable comparison indicates that the present invention provides an azimuth beam capture performance comparable to that achievable with the availability of the distance measuring equipment transmitted signal.

Figure 1B:
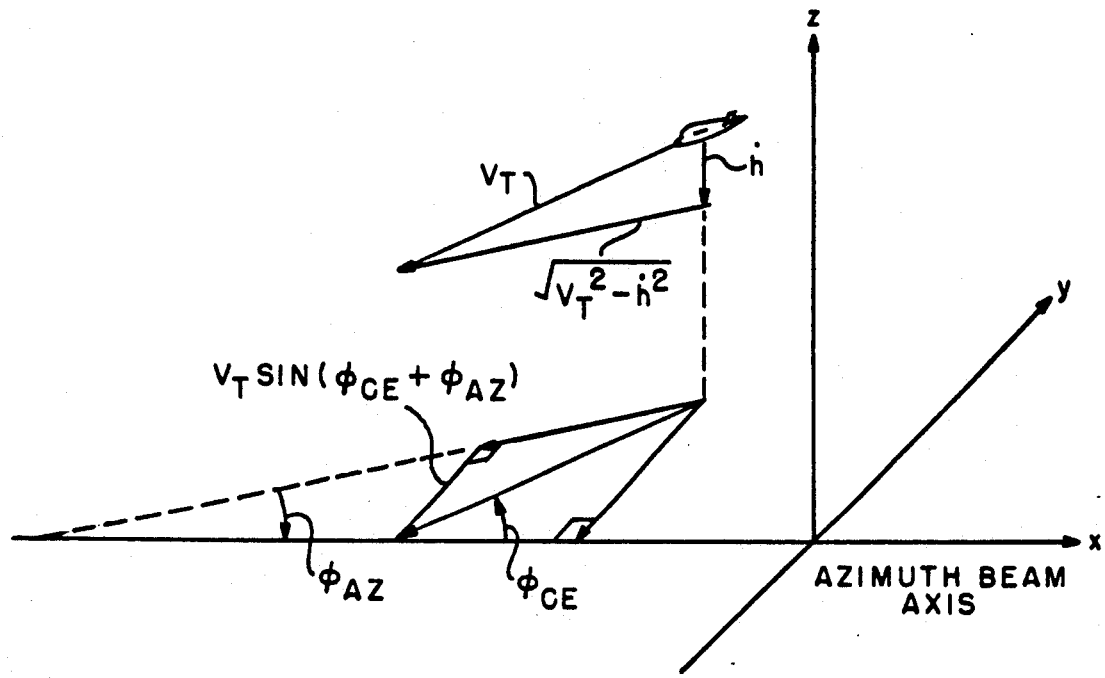

Refer now to FIG. 1b, wherein vectors representing the aircraft motion are shown. It is apparent from the figure that the velocity component X along the path X of FIG. 1a, and the velocity component Y parallel to the Y-axis, are respectively given by equations 1 and 2.

$$\dot{X} = \sqrt{(V_T)^2 - (\dot{h})^2} \; \cos(\Phi_{CE} + \Phi_{AZ}) \tag{1}$$

$$\dot{Y} = \sqrt{(V_T)^2 - (\dot{h})^2} \; \sin \Phi_{CE} \tag{2}$$

where:
$\dot{X}$ is the velocity along the path X;
$\dot{Y}$ is the velocity parallel to the Y-axis;
$V_T$ is the true airspeed;
$\dot{h}$ is the altitude rate;
$\Phi_{CE}$ is the course error; and
$\Phi_{AZ}$ is the angular position of the aircraft relative to the plane of the azimuth beam.

These velocity components may also be given in terms of the projected distance X of the aircraft to the DME transmitter. Should the distance measuring equipment malfunction, an estimate of this distance may be provided that may be utilized to provide estimated component velocities. It should be apparent that estimated velocities $\dot{X}_E$ and $\dot{Y}_E$ may be given in terms of the estimated distance $X_E$ and parameters defined in equation 1 by the equations 3 and 4, respectively.

$$\dot{X}_E = \frac{\dot{h} + X_E[\dot{\Phi}_{AZ} \sin\Phi_{AZ} \tan\Gamma_{el} - \dot{\Gamma}_{el} \cos\Phi_{AZ} \sec^2\Gamma_{El}]}{\cos\Phi_{AZ} \tan\Gamma_{el}} \quad (3)$$

$$\dot{Y}_g = \sqrt{(V^T)^2 - (\dot{h})^2} \cos(\Phi_{CE} + \Phi_{AZ}) \sin\Phi_{AZ} + X_E\dot{\Phi}_{AZ}\cos\Phi_{AZ} \quad (4)$$

where:

$\Gamma_{el}$ is the elevation angle of the referenced to the DME transmitter location in the plane of the glide slope beam;

$\dot{\Gamma}_{el}$ is the elevation rate; and $\dot{\Phi}_{AZ}$ is the azimuthal rate of the aircraft.

When the estimated distance $X_E$ is equal to the true distance, the true and estimated velocity components are equal. Consequently, the ratios of $\dot{X}/\dot{X}_E$ and $\dot{Y}/\dot{Y}_E$ are measures of the accuracy of the estimated distance. Thus, by a series of successive approximations, an estimated distance substantially equal to the true distance may be achieved. Each successive approximation for $X_E$ may be established by selecting the maximum of the X velocity ratio and the Y velocity ratio, multiplied by the estimated distance utilized for determining those ratios. Thus, in accordance with the invention, the ratios of equations 5 and 6 are successively determined, with each successive estimates so that:

$$X_{En} = (\dot{X}/\dot{X}_E)_{n-1} X_{E(n-1)} \text{ or } (\dot{Y}/\dot{Y}_E)_{n-1} X_{E(n-1)} \quad (5)$$

$$\left(\frac{\dot{X}}{\dot{Y}_E}\right)_n = \frac{\sqrt{(VT)^2 - (\dot{h})^2} \cos(\Phi_{CE} + \Phi_{AZ})\cos\Phi_{AZ} \tan\Gamma_{el}}{\dot{h} + X_{En}[\dot{\Phi}_{AZ} \sin\Phi_{AZ} \tan\Gamma_{el} - \dot{\Gamma}_{el} \cos\Phi_{AZ} \sec^2\Gamma_{el}]}$$

$$\left(\frac{\dot{Y}}{\dot{X}_E}\right) = \frac{\sqrt{(VT)^2 - (\dot{h})^2} \sin\Phi_{CE}}{\sqrt{(VT)^2 - (\dot{h})^2} \cos(\Phi_{CE} + \Phi_{AZ})\sin\Phi_{AZ} + X_{En}\dot{\Phi}_{AZ}\cos\Phi_{AZ}} \quad (6)$$

Occasionally, the radio altimeter in the aircraft may malfunction, and an accurate estimate of the altitude is desired to replace that ordinarily provided by the radio altimeter. Such an altitude estimate may be achieved with the utilization of the estimated distance $X_E$. During landing procedure, the aircraft is quickly maneuvered to acquire the glide slope beam. Consequently, in determining the altitude, the selected elevation angle $\Gamma_{el}$ for the glide slope beam may be used with the estimated distance to the DME transmitter and the known length of the runway as indicated in equation 7 to provide the desired altitude estimate $h_E$.

$$h_E = (X_E - W)\tan\Gamma_{sel} \approx D\Gamma_{sel} \quad (7)$$

Figure 6:
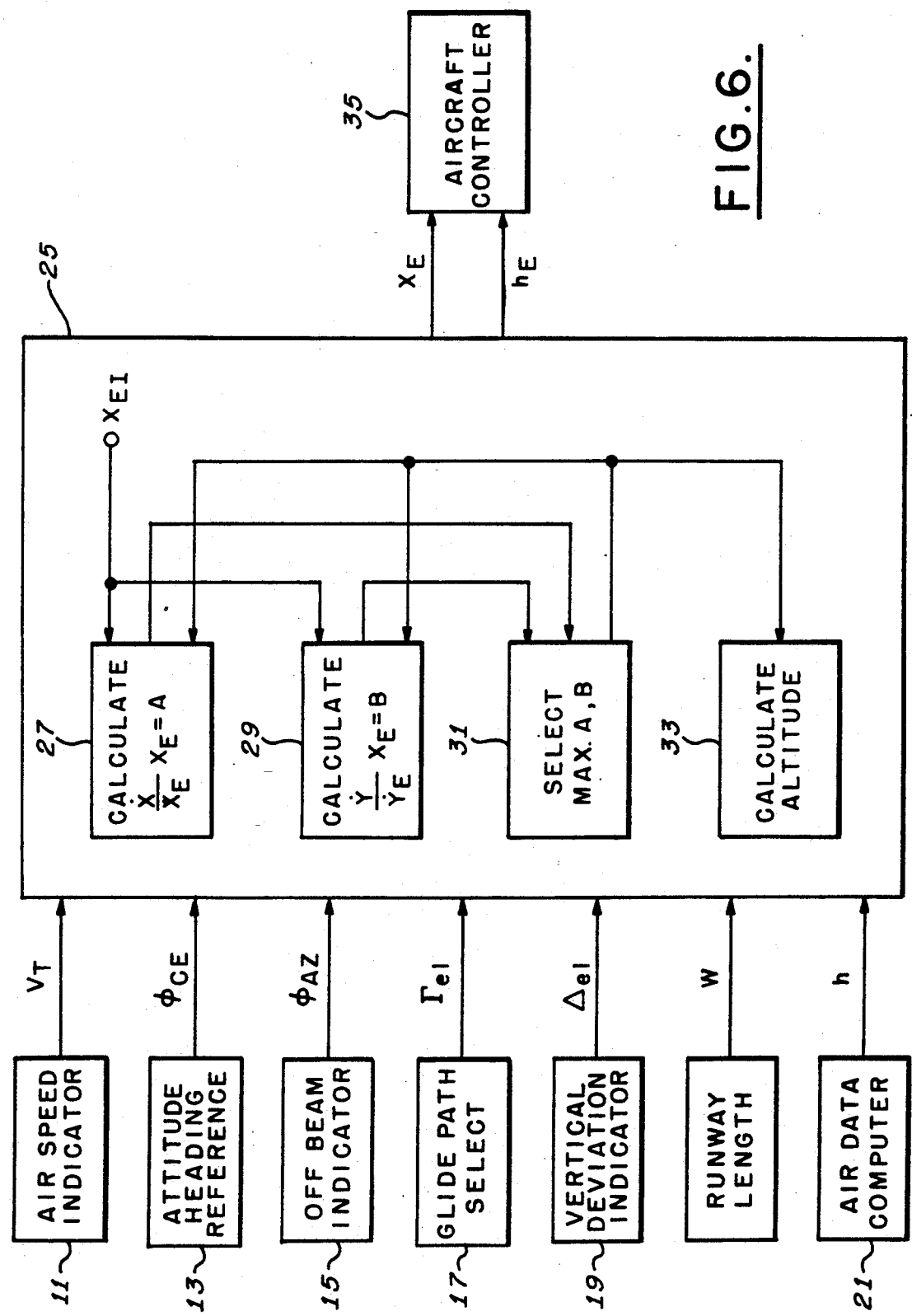
FIG. 6 is a block diagram of a system for deriving an estimated distance in accordance with the present invention.

Refer now to FIG. 6, wherein a block diagram of the preferred embodiment of the invention is shown. Subsystems aboard the aircraft provide all the necessary parameters for providing the estimated distance $X_E$ and estimated altitude $h_E$. An airspeed indicator 11 provides the true airspeed $V_T$, an Altitude Heading Reference System (AHRS) 13 provides the course error angle, $\Phi_{CE}$, while an off-beam indicator 15 provides the angle $\Phi_{AZ}$. In a MLS, the glide slope elevation angle $\Gamma_{sel}$ is selectable through a guide path selector 17, while the deviation of a selected guide path $\Delta_{el}$ is provided by a vertical deviation indicator. Also available are the runway length, W, which is known for each airport, and the altitude rate $\dot{h}$ provided by an air data computer 21. These parameters are coupled to a computer 25 wherein a routine 27, having an initial value $X_{EI}$ coupled thereto, calculates $\dot{X}$ and $\dot{X}_E$, takes the ratio thereof and multiplies it by $X_E$ utilized for the computation of the ratio to provide a value A. A second routine 29 calculates $\dot{Y}$ and $\dot{Y}_E$, takes the ratio thereof, and multiples the ratio by $X_E$, the estimated distance utilized in determining the ratio, to establish a second value B. A and B are coupled to a routine 31 wherein the maximum of A and B is selected as the subsequent distance estimate for use in the routines of 27 and 29. The maximum value is also coupled to a routine 33 which provides estimated altitudes with the utilization of $X_E$, the runway length, and the selected glide slope. The estimations $X_E$ and $h_E$ are coupled from the computer 25 to an aircraft controller 35 where they are utilized, when necessary, to control the aircraft during the landing maneuver.

The system of FIG. 6 may be utilized to compute the equations 1 through 7 without approximations. Appreciable reductions in processing time, however, may be achieved with judicial parameter approximations.

It should be understood that other ratio formulations may be considered. For example, the true velocity component $V_T\sin(\Phi_{CE}+\Phi_{AZ})$ indicated in FIG. 1b and the estimated component $\dot{Y}_E$, taken as the rate of closure to the glide slope beam while the distance X remains constant, that is, $\dot{Y}_E = X\dot{\Phi}_{AZ}$, may be used to form the lateral velocity ratio, as indicated in equation 8.

$$\left(\frac{\dot{Y}}{\dot{Y}_E}\right)_n = \frac{V_T\sin(\Phi_{AZ} + \Phi_{CE})}{X_{En} \dot{\Phi}_{AZ}} \quad (8)$$

It is evident from Equation 8 that an appreciable saving of processing time and components in a hard wired system is realized with this formulation. Additionally, equation 5 may be approximated for small elevation and beam offset angles, as shown in equation 9.

$$\left(\frac{\dot{X}}{\dot{X}_E}\right)_n = \frac{V_T \Gamma_{el} \cos(\Phi_{AZ} + \Phi_{CE})}{\dot{h} - X_{En}\dot{\Gamma}_{el}} \quad (9)$$

Figure 7:
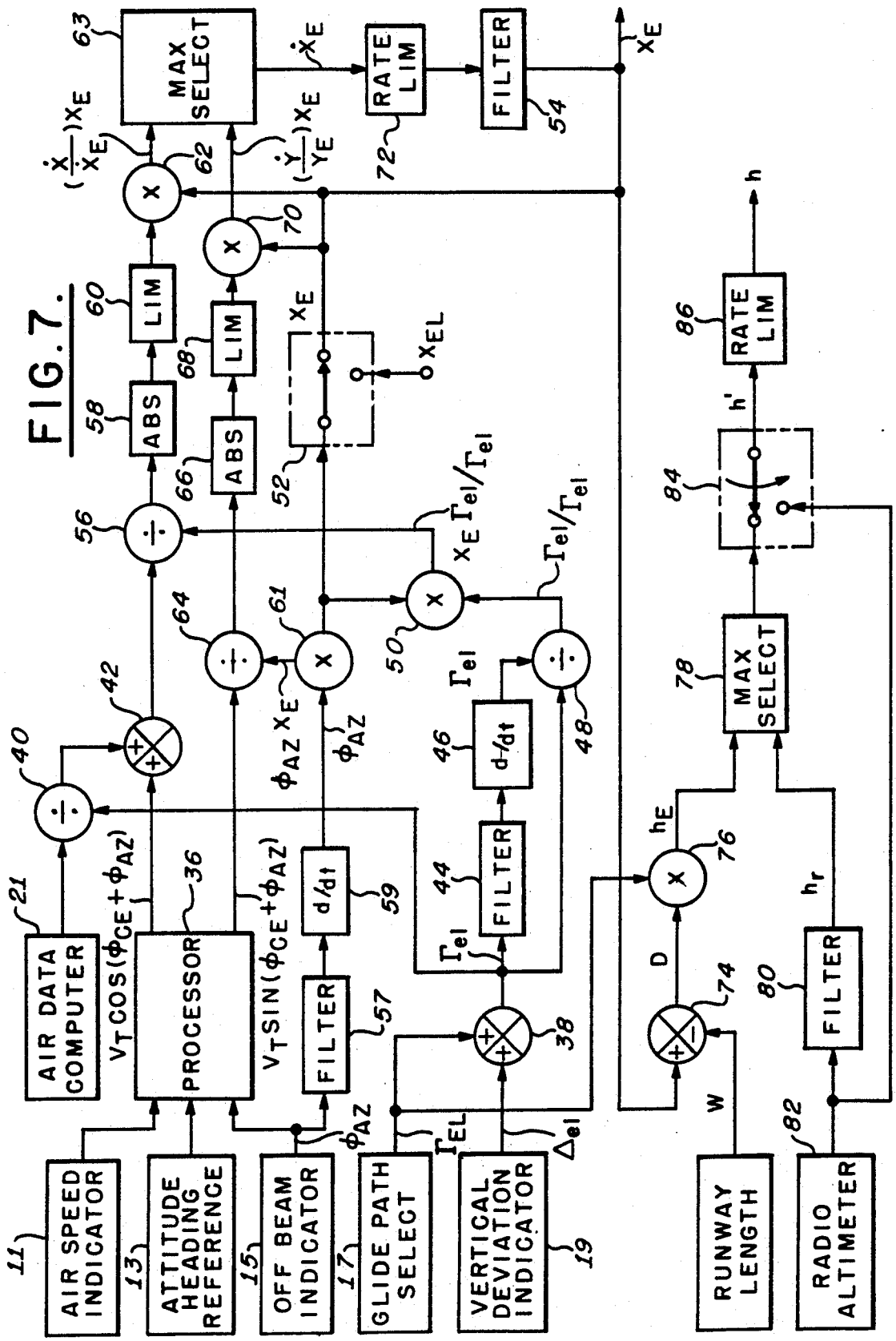
FIG. 7 is a block diagram of the preferred embodiment of the invention.

Still another ratio that may be utilized to establish the estimated distance is shown in equation 10, which, with equation 8, may be implemented in a hard wired system such as that shown in the FIG. 7.

$$\left(\frac{\dot{X}}{\dot{X}_E}\right)_n = \frac{V_T\cos(\Phi_{CE} + \Phi_{AZ}) + \dot{h}/\Gamma_{el}}{X_{En}\dot{\Gamma}_{el}/\Gamma_{el}} \quad (10)$$

Refer now to FIG. 7 wherein previously reference elements bear the reference numerals previously assigned. A signal representative of the aircraft speed is coupled from the airspeed indicator 11 to a processor 36. Also coupled to the processor 36 are signals from the Attitude Heading Reference System 13 representative of the course error signal $\Phi_{CE}$ and signals from the offbeam indicator 15, representative of the angular deviation from glide slope beam $\Phi_{AZ}$. These signals are processed by processor 36, which provides signals representative of $V_T \cos(\Phi_{AZ}+\Phi_{CE})$ and $V_T \sin(\Phi_{AZ}+\Phi_{CE})$. Glide path selector 17 and the vertical deviation indicator 19, respectively couple signals representative of glide slope beam elevation angle $\Gamma_{SEL}$ and the deviation angle from this selected slope $\Delta el$ to summation network 38 wherefrom a signal representative of the elevation angle $\Gamma_{el}$ is coupled to a divider network to which a signal is also coupled from the air data computer 21 that is representative of the altitude rate of the aircraft. The signal representative of the ratio $\dot{h}/\Gamma_{el}$ is coupled to summation network 42 wherein it is added to the signal representative of $V_T \cos(\Phi_{CE}+\Phi_{AZ})$. The signal representative of the vertical elevation angle $\Gamma_{el}$ is also coupled from the summation network 38 through a noise filter 44 to a differentiating circuit 46 wherefrom a signal representative of the elevation angle rate $\dot{\Gamma}_{el}$ is coupled to a divider network 48 to which the elevation angle $\Gamma_{el}$ is also coupled. A signal representative of the ratio of the elevation angle rate to the elevation angle is coupled from the divider network 48 to a multiplier 50 wherein it is multiplied by the estimated distance $X_E$, established by the previous iteration, coupled by a switch 52 from an output noise filter 54. During the initial run of the system, switch 52 is set to couple an initial estimated distance $X_{EI}$ to the multiplier 50. After this initial estimated distance has been utilized, switch 52 is set to couple the estimated distance representative signal from the output noise filter 54 to the multiplier 50. A signal representative of the product established in multiplier 50 and a signal representative of the sum established in addition network 42 are coupled to a divider network 56 which provides a signal representative of the ratio shown in equation (10). This ratio $(\dot{X}/\dot{X}_E)_n$ is coupled to an absolute value network 58 wherefrom the signal representative of the absolute value of the ratio is coupled via a limiter 60 to a multiplying network 62 wherein the ratio is multiplied by the estimated distance $X_{En}$ provided by the filter 54 after the previous iteration to couple a signal representative of $(\dot{X}/\dot{X}_E)X_E$ to a maximum selection network 56. Limiter 60 is set to maintain the ratio $(\dot{X}/\dot{X}_E)_n$ within specified limits to ensure rapid convergence to an accurate estimated distance. This ratio limit may typically be between 0.5 and 2.

Offbeam indicator 15 also couples a signal representative of $\Phi_{AZ}$ via a filter 57 to a differentiating circuit 59 wherefrom a signal representative of the offbeam angular rate of change $\dot{\Phi}_{AZ}$ is coupled to a multiplying network 61 wherein it is multiplied by the estimated distance $X_E$ of the previous iteration coupled from the switch 52. The signal representative of $\dot{\Phi}_{AZ}X_E$ and the signal representative of $V_T \sin(\Phi_{CE}+\Phi_{AZ})$ are coupled to a divider network 64 wherefrom a signal representative of the ratio indicated in equation 8 is coupled to an absolute value network 66. The absolute value provided by the absolute value network 66 is coupled through a limiter 68, typically set to limit the ratio between 0.5 and 2, to a multiplier 70 wherein the ratio $(\dot{Y}/\dot{Y}_E)$ is multiplied by the value $X_E$ of the previous iteration coupled from the output filter 54 and wherefrom a signal representative of the product $(\dot{Y}/\dot{Y}_E)X_E$ is coupled to the maximum selection circuit 63. Maximum selection circuit 63 selects the maximum of the two products, $(\dot{X}/\dot{X}_E)X_E$ and $(\dot{Y}/\dot{Y}_E)X_E$ and couples the selected product to a rate limiter 72 which limits the estimated distance change between two iterations to that of a specified multiple of the airspeed $V_T$, which typically may be 1.3, and couples the estimated distance $X_E$ to the output terminal of the system via the lag filter 54.

The estimated distance value $X_E$ at the output terminals of the lag filter 54 is also coupled to a differencing network 74 wherein a signal representative of the runway length W being approached therefrom, and the signal representative of the distance between the aircraft and the foot of the runway D is coupled to a multiplier 76. A signal representative of the selected elevation angle $\Phi_{SEL}$ from the glide slope path selector 17 is also coupled to the multiplier 76 wherefrom an estimated altitude $h_E$, as indicated in equation 7, is coupled to a maximum selection circuit 78. Also coupled to the maximum selection network 78 is a signal hr coupled through a noise filter 80 from a radio altimeter 82. Maximum selection circuit 78 selects the maximum of the two altitude-representative signals, which is then coupled through a switch 84 and a rate limiter 86 to the aircraft control circuits. If the radio altimeter emits a clear and accurate signal, the operator, at his discretion, positions the switch 84 to couple the radio altimeter signal directly to the rate limiter 86.

Figure 8:
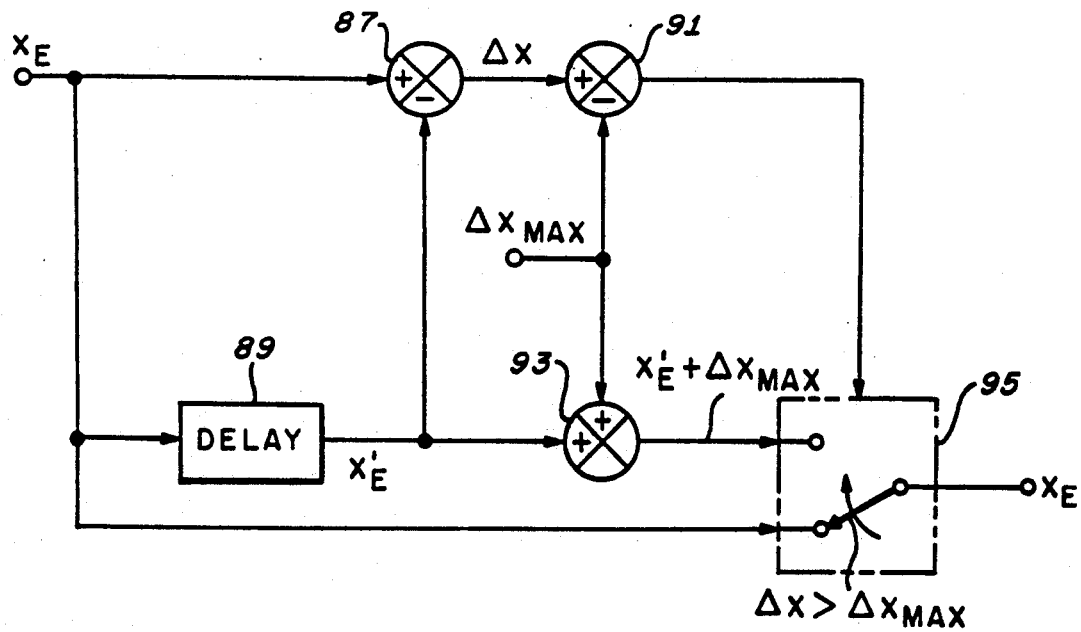
FIG. 8 is a block diagram of a rate limiter which may be utilized for the rate limiters are shown in FIG. 7.

Refer now to FIG. 8, wherein a limiter suitable for use as the limiters 72 and 86 in FIG. 7 is shown. Since the two limiters operate in the same manner, the operation will be explained with reference to distance estimator only. The estimated distance $X_{En}$ from the max selector 56 is coupled to a differencing network wherein the estimated distance $X_{E(n-1)}$ of the previous iteration coupled through delay network 89 is subtracted therefrom to establish an estimated distance differential $\Delta X$ between the two estimates. This estimated distance differential $\Delta X$ is coupled to a comparison network 91 wherein it is compared to a maximum allowable distance estimate differential $\Delta X_{max}$. The maximum allowable distance differential $\Delta X_{max}$ and $X_{E(n-1)}$ are also coupled to summation network 93 which has an output terminal coupled to a switch 95. Switch 95 is also coupled to receive the present estimated distance $X_E$ and is activated by a signal from summation network 91. Should the differential $\Delta X$ exceed $\Delta X_{max}$ the switch 95 is activated to couple the output terminal of summation network 95 to lag filter 54 as estimated distance $X_E$, otherwise switch 95 couples the present estimated distance $X_E$ to the lag filter 54.

While the invention has been described in its preferred embodiments, it is to be understood that the words which have been used are words of description rather than limitation and that changes may be made within the purview of the appended claims without departing from the true scope and spirit of the invention and its fuller aspects.

I claim:

1. In an apparatus having a controller for guiding a moving vehicle to and along a predetermined path, the controller requiring distance of the vehicle to a stationary location for such guidance, the improvement comprising:

parameter means for determining parameters of motion of said vehicle;

distance means for providing an estimate of distance to said stationary location, thereby providing a distance estimate;

means coupled to receive at least one of said parameters and said distance estimate for providing first and second intermediate estimated distances to said stationary location;

selection means coupled to said estimator means for selecting one of said first and second intermediate estimated distances, whichever is greater, to provide an up-dated distance estimate and coupling said up-dated distance estimate to said distance means as said distance estimate; and means coupled to said selection means for providing said up-dated distance estimate to said controller wherefrom control signals are coupled to controls of said vehicle for guidance to and along said path.

2. A method of providing an estimated distance of a moving vehicle from a stationary location to a controller requiring such distance for guiding the vehicle to and along a predetermined path comprising the steps of:

determining parameters of motion of said vehicle:

determining an actual velocity along a path of said vehicle;

providing an initial estimated distance and a second estimated distance of said vehicle from said stationary location;

selecting said second estimated distance after said initial estimated distance has been provided, thereby providing an estimated distance;

establishing an estimated velocity along said path from at least one of said parameters and said estimated distance;

forming an up-dating factor from said actual velocity and said estimated velocity;

establishing an up-dated estimated distance from said up-dating factor and said estimated distance;

providing said up-dated estimated distance as said second estimated distance in said selecting step; and providing said estimated distance to said controller, wherefrom path control signals are coupled to said vehicle for guidance to and along said predetermined path.

3. A method of estimating a distance in accordance claim 2 wherein the step of forming an up-dating factor includes forming a ratio of said actual velocity to said estimated velocity.

4. A method in accordance with claim 3 wherein said step of establishing an up-dated estimated distance includes multiplying said estimated distance by said ratio.

5. A method in accordance with claim 2 wherein said step of forming an up-dating factor includes the steps of forming first and second up-dating factors; and said step of establishing an estimated distance includes the steps of multiplying said estimated distance by said up-dating factor to establish first and second up-dated distances, respectively, and further including a step of selecting one of said first and second up-dated estimated distances, whichever is greater, to establish said up-dated estimated distance.

6. In an apparatus having a controller for guiding a vehicle to and along a predetermined path, the controller requiring distance of the vehicle from a stationary location for such guidance, the improvement comprising:

means for determining parameters of motion of said vehicle;

means coupled to receive at least one of said parameters of motion for determining an actual velocity of said vehicle;

means for providing an initial estimated distance of said vehicle from said stationary location;

a switch coupled to receive said initial estimated distance and having means for receiving a second estimated distance of said vehicle from said stationary location, said switch providing said second estimated distance after providing said initial estimated distance, thereby providing an estimated distance;

means coupled to receive at least one of said parameters and said estimated distance for establishing an estimated velocity;

means coupled to receive said actual and estimated velocities for establishing an up-dating factor;

means coupled to receive said up-dating factor and said estimated distance for establishing an up-dated estimated distance, said up-dated estimated distance being a function of said up-dating factor and said estimated distance;

means coupled to said up-dated estimated distance means for providing said up-dated estimated distance to said switch as said second estimated distance; and means coupled to said up-dated estimated distance means for providing said up-dated estimated distance to said controller, wherefrom vehicle control signals are coupled to controls of said vehicle for guidance to and along said path.

7. An apparatus in accordance with claim 6 wherein said up-dating factor is a ratio of said actual velocity to said estimated velocity.

8. An apparatus in accordance with claim 7 wherein said up-dated estimated distance is established by multiplying said estimated distance by said ratio.

9. An apparatus in accordance with claim 6 wherein:

said actual velocity means provides first and second actual velocities;

said estimated velocity means provides first and second estimated velocities;

said up-dating factor means includes means for establishing a first up-dating factor utilizing said first actual velocity and said first estimated velocity and a second up-dating factor utilizing said second actual velocity and said second estimated velocity;

said up-dated estimated distance means is coupled to receive said first and second up-dating factors to establish first and second up-dated distances, said first up-dated distance being a function of said estimated distance and said first up-dating factor and said second up-dated distance being a function of said estimated distance and said second up-dating factor; and further includes;

means coupled to receive said first and second up-dated distances for selecting one of said first and second up-dated distances as said up-dated estimated distance.

10. An apparatus in accordance with claim 9 wherein:

said first up-dating factor is a first ratio of a first component of said actual velocity to a corresponding first component of said estimated velocity; and said second up-dating factor is a second ratio of a second component of said actual velocity to a corresponding second component of said estimated velocity.

11. An apparatus in accordance with claim 10 wherein said selecting means selects whichever of said first and second up-dated estimated distances is greater.

12. An apparatus in accordance with claim 11 wherein said moving vehicle is a landing aircraft and said first ratio is $$\left(\frac{\dot{X}}{\dot{X}_E}\right) = \frac{\sqrt{(V_T)^2 - (\dot{h})^2} \cos(\Phi_{CE} + \Phi_{AZ})\cos\Phi_{AZ}\tan\Gamma_{el}}{\dot{h} + X_E[\dot{\Phi}_{AZ}\sin\Phi_{AZ}\tan\Gamma_{el} - \dot{\Gamma}_{el}\cos\Phi_{AZ}\sec^2\Gamma_{el}]}$$

and said second ratio is $$\left(\frac{\dot{Y}}{\dot{Y}_E}\right) = \frac{\sqrt{(V_T)^2 - (\dot{h})^2}\sin\Phi_{CE}}{\sqrt{(V_T)^2 - (\dot{h})^2}\cos(\Phi_{CE} + \Phi_{AZ})\sin\Phi_{AZ} + X_E\dot{\Phi}\cos\Phi_{AZ}}$$

where:
$\dot{X}$ and $\dot{X}_E$ are said actual and estimated first component velocities
$\dot{Y}$ and $\dot{Y}_E$ are said actual and estimated second component velocities
$V_T$ is true airspeed;
$\dot{h}$ is altitude rate;
$\Gamma_{el}$ is an elevation angle of said aircraft;
$\Phi_{CE}$ is course error; and
$\Phi_{AZ}$ is angular deviation of said aircraft position relative to a predetermined vertical plane
$\dot{\Phi}_{AZ}$ is angular deviation rate.

13. An apparatus in accordance with claim 12 wherein said vehicle is a landing aircraft and further including:
  altimeter means for receiving aircraft altitude from an altimeter;
  estimated altitude means coupled to receive an elevation angle from said parameter means and to receive said estimated distance for providing an estimated altitude; and
  selector means coupled to receive said aircraft altitude and said estimated altitude for selecting whichever is greater, thereby providing a maximum altitude; and switch means coupled to said selector means and said altitude means for selecting one of said aircraft altitude and said maximum altitude.

14. An apparatus in accordance with claim 11 wherein said moving vehicle is a landing aircraft and said second ratio is $$\left(\frac{\dot{Y}}{\dot{Y}_E}\right) = \frac{V_T\sin(\Phi_{AZ} + \Phi_{CE})}{X_E\dot{\Phi}_{AZ}}$$

$\dot{Y}$ and $\dot{Y}_E$ are said actual and estimated second component velocities
$V_T$ is true airspeed;
$\dot{\Phi}_{AZ}$ is the angular position rate of said aircraft relative to a predetermined vertical plane;
$\Phi_{CE}$ is course error of said aircraft;

$\Phi_{AZ}$ is angular deviation of said aircraft position relative to said predetermined plane; and
$X_E$ is said estimated distance.

15. An apparatus in accordance with claim 14 wherein said first ratio is $$\left(\frac{\dot{X}}{\dot{X}_E}\right) = \frac{V_T\Gamma_{el}\cos(\Phi_{AZ} + \Phi_{CE})}{\dot{h} - X_E\dot{\Gamma}_{el}}$$

where
$\Gamma_{el}$ is an elevation angle of said aircraft;
$\dot{\Gamma}_{el}$ is an elevation angle rate of said aircraft; and
$\dot{h}$ is an altitude rate of said aircraft.

16. An apparatus in accordance with claim 14 wherein said first ratio is $$\left(\frac{\dot{X}}{\dot{X}_E}\right) = \frac{V_T\cos(\Phi_{CE} + \Phi_{AZ}) + \dot{h}/\Gamma_{el}}{X_E\dot{\Gamma}_{el}/\Gamma_{el}}$$

where
$\Gamma_{el}$ is an elevation angle of said aircraft;
$\dot{\Gamma}_{el}$ is an elevation angle rate of said aircraft; and
$\dot{h}$ is an altitude rate of said aircraft.

17. An apparatus in accordance with claim 14 wherein said vehicle is a landing aircraft and further including:
  altimeter means for receiving aircraft altitude from an altimeter;
  estimated altitude means coupled to receive an elevation angle from said parameter means and to receive said estimated distance for providing an estimated altitude; and
  selector means coupled to receive said aircraft altitude and said estimated altitude for selecting whichever is greater, thereby providing a maximum altitude; and switch means coupled to said selector means and said altitude means for selecting one of said aircraft altitude and said maximum altitude.

18. An apparatus in accordance with claim 11 wherein said vehicle is a landing aircraft and further including:
  altimeter means for receiving aircraft altitude from an altimeter;
  estimated altitude means coupled to receive an elevation angle from said parameter means and to receive said estimated distance for providing an estimated altitude; and
  selector means coupled to receive said aircraft altitude and said estimated altitude for selecting whichever is greater, thereby providing a maximum altitude; and switch means coupled to said selector means and said altitude means for selecting one of said aircraft altitude and said maximum altitude.

* * * * *